(12) United States Patent
Chen et al.

(10) Patent No.: US 10,582,382 B2
(45) Date of Patent: Mar. 3, 2020

(54) METHODS AND DEVICES OF AUTHENTICATING NON-SIM MOBILE TERMINALS ACCESSING A WIRELESS COMMUNICATION NETWORK

(71) Applicant: Telefonaktiebolaget L M Ericsson (publ), Stockholm (SE)

(72) Inventors: Ping Chen, Shanghai (CN); Pengbo Duan, Shanghai (CN); Jiarong Wang, Shanghai (CN); Hao Zou, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 14/777,102

(22) PCT Filed: Sep. 1, 2015

(86) PCT No.: PCT/CN2015/088755
§ 371 (c)(1),
(2) Date: Sep. 15, 2015

(87) PCT Pub. No.: WO2017/035781
PCT Pub. Date: Mar. 9, 2017

(65) Prior Publication Data
US 2017/0150350 A1    May 25, 2017

(51) Int. Cl.
*H04W 12/06*    (2009.01)
*H04W 8/04*    (2009.01)
(Continued)

(52) U.S. Cl.
CPC ......... *H04W 12/06* (2013.01); *H04L 63/0892* (2013.01); *H04W 8/04* (2013.01);
(Continued)

(58) Field of Classification Search
CPC ...... H04L 63/08; H04L 61/203; H04W 12/06; H04W 12/08; H04W 12/12; H04W 88/02;
(Continued)

(56) References Cited

U.S. PATENT DOCUMENTS

| 6,591,095 | B1 | 7/2003 | Palaniswamy |
| 6,795,701 | B1 | 9/2004 | Baker |

(Continued)

FOREIGN PATENT DOCUMENTS

| CN | 1434610 A | 8/2003 |
| CN | 1674497 A | 9/2005 |

(Continued)

OTHER PUBLICATIONS

International Search Report and Written Opinion for International Patent Application No. PCT/CN2015/088755, dated May 27, 2016, 11 pages.

(Continued)

*Primary Examiner* — Jinsong Hu
*Assistant Examiner* — Nicole M Louis-Fils
(74) *Attorney, Agent, or Firm* — Rothwell, Figg, Ernst & Manbeck, P.C.

(57) ABSTRACT

In a first aspect of the disclosure, a method performed by an AAA server (103) of authenticating a non-SIM mobile terminal (111) with a wireless network (100) is provided. The method comprises receiving (S201) a request for service of the non-SIM mobile terminal (111), authenticating (S202) the non-SIM mobile terminal (111), submitting (S203) a request for subscriber profile data associated with the non-SIM mobile terminal (111) to an HSS (105), the subscriber profile data request comprising an indication that the non-SIM mobile terminal (111) has been authenticated by the AAA server (103), and to receiving (S204) from the HSS (105), in response to the indication that the non-SIM mobile
(Continued)

terminal (111) has been authenticated, the requested subscription profile data.

19 Claims, 6 Drawing Sheets

(51) Int. Cl.
*H04W 8/10* (2009.01)
*H04W 12/04* (2009.01)
*H04L 29/12* (2006.01)
*H04L 29/06* (2006.01)

(52) U.S. Cl.
CPC ............. *H04W 8/10* (2013.01); *H04W 12/04* (2013.01); *H04L 61/203* (2013.01)

(58) Field of Classification Search
CPC ....... H04W 60/00; H04W 60/04; H04W 8/04; H04W 8/10; H04W 12/04; H04W 8/26
USPC ............................. 455/411, 435.1; 370/329
See application file for complete search history.

(56) References Cited

U.S. PATENT DOCUMENTS

| | | | |
|---|---|---|---|
| 8,984,105 | B2 | 3/2015 | Vangala |
| 2004/0162998 | A1 | 8/2004 | Tuomi |
| 2006/0133319 | A1 | 6/2006 | Kant |
| 2006/0155822 | A1 | 7/2006 | Yang |
| 2008/0161049 | A1 | 7/2008 | Lagnado |
| 2009/0298467 | A1 | 12/2009 | Zohar |
| 2011/0004762 | A1* | 1/2011 | Horn ..................... H04W 12/04 713/171 |
| 2014/0036873 | A1* | 2/2014 | Cheng ............... H04W 36/0022 370/331 |
| 2014/0086177 | A1* | 3/2014 | Adjakple .............. H04W 12/08 370/329 |
| 2014/0146806 | A1 | 5/2014 | Liu et al. |
| 2014/0148129 | A1 | 5/2014 | Lundstrom |
| 2014/0380041 | A1* | 12/2014 | Gupta ................... H04W 12/06 713/155 |
| 2015/0172315 | A1* | 6/2015 | Hirst ................... H04L 63/0861 726/5 |
| 2016/0164883 | A1* | 6/2016 | Li ........................ H04W 12/04 726/7 |
| 2016/0165445 | A1* | 6/2016 | Schroeder ............ H04W 12/06 455/411 |
| 2016/0262021 | A1* | 9/2016 | Lee ....................... H04L 63/083 |
| 2016/0344716 | A1* | 11/2016 | Mantha ................... H04L 63/08 |

FOREIGN PATENT DOCUMENTS

| | | |
|---|---|---|
| CN | 101106508 A | 1/2008 |
| CN | 101120602 A | 2/2008 |
| CN | 101606372 A | 12/2009 |
| CN | 102917356 A | 2/2013 |
| CN | 103379494 A | 10/2013 |
| WO | 03/017125 A1 | 2/2003 |
| WO | 2015006316 A1 | 1/2015 |

OTHER PUBLICATIONS

3rd Generation Partnership Project; Technical Specification Group Services and System Aspects; Architecture enhancements for non-3GPP accesses (Release 13), 3GPP TS 23.402, V13.2.0 (Jun. 2015), 292 pages.
3rd Generation Partnership Project; Technical Specification Group Core Network and Terminals; Cx and Dx interfaces based on the Diameter protocol; Protocol details (Release 12), 3GPP TS 29.229, V12.6.0 (Jun. 2015), 38 pages.
3rd Generation Partnership Project; Technical Specification Group Core Network and Terminals; Evolved Packet System (EPS); 3GPP EPS AAA interfaces (Release 13), 3GPP TS 29.273, V13.0.0 (Jun. 2015), 162 pages.
3rd Generation Partnership Project; Technical Specification Group Services and System Aspects; 3GPP System Architecture Evolution (SAE); Security aspects of non-3GPP accesses (Release 12), 3GPP TS 33.402, V12.5.0 (Dec. 2014), 56 pages.
International Search Report and the Written Opinion of the International Searching Authority dated Jun. 30, 2015, in International Application No. PCT/CN2015/076667, 12 pages.
3GPP, 3rd Generation Partnership Project; Technical Specification Group Services and System Aspects; 3GPP system to Wireless Local Area Network (WLAN) interworking; System description (Release 12), 3GPP TS 23.234 V12.0.0, 2014, 84 pages.
3GPP, 3rd Generation Partnership Project; Technical Specification Group Services and System Aspects; Architecture enhancements for non-3GPP accesses (Release 12), 3GPP TS 23.402 V12.6.0, 2014, 288 pages.
3GPP, 3rd Generation Partnership Project; Technical Specification Group Core Network and Terminals; Evolved Packet System (EPS); 3GPP EPS AAA interfaces (Release 12), 3GPP TS 29.273 V12.5.0, 2014, 156 pages.
Extended European Search Report dated Feb. 4, 2019 issued for European Patent Application No. 15902588.1, 9 pages.
Communication pursuant to Article 94(3) EPC, dated Nov. 28, 2019, issued European Application No. 15 902 588.1-1218 (6 pages).
3GPP TS 33.402, V12.5.0 (Dec. 2014), "3rd Generation Partnership Project; Technical Specification Group Services and System Aspects; 3GPP System Architecture Evolution (SAE); Security aspects of non-3GPP accesses (Release 12)", Dec. 19, 2014 (56 pages).

* cited by examiner

METHODS AND DEVICES OF AUTHENTICATING NON-SIM MOBILE TERMINALS ACCESSING A WIRELESS COMMUNICATION NETWORK

CROSS-REFERENCE TO RELATED APPLICATION

This application is a 35 U.S.C. § 371 National Phase Entry Application from PCT/CN2015/088755, filed Sep. 1, 2015, and designating the United States.

TECHNICAL FIELD

The disclosure relates to a method and device of authenticating a non-Subscriber Identity Module (SIM) mobile terminal with a wireless network, and a method and device of providing requested subscriber profile data associated with a non-SIM mobile terminal in a wireless network. The disclosure further relates to computer programs for causing the devices to perform the methods according to the disclosure, and corresponding computer program products.

BACKGROUND

For small cell applications in mobile broadband heterogeneous networks, WiFi—i.e. access via Wireless Local Area Networks (WLANs)—is today considered a key solution. There is currently an intense activity on a global basis on how to integrate WiFi, Worldwide Interoperability for Microwave Access (WiMAX) and CDMA2000 ("Code Division Multiple Access") with 3rd Generation Partnership Project (3GPP) communication networks in order to offer, in a similar fashion as any 3GPP radio access technology, WiFi integrated with the 3GPP Evolved Packet Core (EPC), i.e. the core network in the Long-Term Evolution (LTE) standard, where the access authentication and authorization is controlled through the network.

Prior art methods exist where the EPC network can be accessed via WiFi, where the WiFi access is authenticated using Subscriber Identity Module (SIM) based authentication methods utilizing for instance Extensible Authentication Protocol (EAP) methods, such as EAP-SIM, EAP-AKA ("Authentication and Key Agreement") or EAP-AKA', towards the same network entities as are used for 3GPP. For non-SIM Devices such as tablets, laptops, video game consoles, etc., solutions exist where the devices are authenticated through non-SIM based authentication methods, e.g. the well-known EAP-TLS ("Transport Layer Security"), EAP-TTLS ("Tunneled Transport Layer Security") or Protected Extensible Authentication Protocol (PERP).

Currently, for 2G/3G/4G access, designated entities in the network handles subscription profiles for performing authentication of access to the network. For LTE/4G subscriptions, WiFi or Voice over LTE (VoLTE) access authentication is managed by an entity known as a Home Subscriber Server (HSS).

Authentication of a non-SIM terminal is performed in a 3GPP Authentication, Authorization and Accounting (AAA) server by means of Public Key to Infrastructure (PKI) based authentication methods, such as EAP-TLS/TTLS authentication, and WiFi subscriptions are managed by the HSS similar to the previously mentioned LTE/4G subscriptions, wherein the AAA server downloads required data from the HSS via a 3GPP defined interface referred to as SWx.

In case the non-SIM terminal is associated with an International Mobile Subscriber Identity (IMSI) or virtual IMSI registered with the HSS, the AAA server can download the subscription profile of a user associated with the particular terminal stored in HSS for authentication based on the associated IMSI or virtual IMSI, but the AAA does not need to download an authentication vector comprising required credentials from the HSS.

However, in case no IMSI is associated with the non-SIM terminal, the AAA server cannot download the required user profile/subscription data from the HSS, since the non-SIM terminal has not been registered with the HSS, and the HSS will return an error message to the AAA server. Consequently, the non-SIM terminal cannot be authenticated with the network.

SUMMARY

An object of the present disclosure is to solve, or at least mitigate, this problem in the art and to provide an improved method of authenticating non-SIM devices with a wireless network.

This object is attained in a first aspect of the disclosure by a method performed by an Authentication, Authorization and Accounting (AAA) server of authenticating a non-Subscriber Identity Module (SIM) mobile terminal with a wireless network. The method comprises receiving a request for service of the non-SIM mobile terminal, authenticating the non-SIM mobile terminal, submitting a request for subscriber profile data associated with the non-SIM mobile terminal to a Home Subscriber Server (HSS), the subscriber profile data request comprising an indication that the non-SIM mobile terminal has been authenticated by the AAA server, and receiving from the HSS, in response to the indication that the non-SIM mobile terminal has been authenticated, the requested subscription profile data.

This object is attained in a second aspect of the disclosure by an AAA server configured to authenticate a non-SIM mobile terminal with a wireless network, the AAA server comprising a processing unit and a memory, said memory containing instructions executable by said processing unit, whereby said AAA server is operative to receive a request for service of the non-SIM mobile terminal, authenticate the non-SIM mobile terminal, submit a request for subscriber profile data associated with the non-SIM mobile terminal to an HSS, the subscriber profile data request comprising an indication that the non-SIM mobile terminal has been authenticated by the AAA server, and receive from the HSS, in response to the indication that the non-SIM mobile terminal has been authenticated, the requested subscription profile data.

This object is attained in a third aspect of the disclosure by a method performed by an HSS of providing requested subscriber profile data associated with a non-SIM mobile terminal to an AAA server in a wireless network, the method comprising receiving, from the AAA server, a request for subscriber profile data associated with the non-SIM mobile terminal, the subscriber profile data request comprising an indication that the non-SIM mobile terminal has been authenticated by the AAA server, and submitting, to the AAA server, in response to the indication that the non-SIM mobile terminal has been authenticated, the requested subscription profile data.

This object is attained in a fourth aspect of the disclosure by an HSS configured to provide requested subscriber profile data associated with a non-SIM mobile terminal to an AAA server in a wireless network, the HSS comprising a processing unit and a memory, said memory containing instructions executable by said processing unit, whereby said HSS is operative to receive, from the AAA server, a request for subscriber profile data associated with the non-SIM mobile terminal, the subscriber profile data request comprising an indication that the non-SIM mobile terminal has been authenticated by the AAA server, and submit, to the AAA server, in response to the indication that the non-SIM mobile terminal has been authenticated, the requested subscription profile data.

Hence, the AAA server receives a request for service of a non-SIM mobile terminal. The non-SIM mobile terminal is referred to as a User Equipment (UE) in the following. Thereafter, the UE is authenticated by the AAA server. In an embodiment, this is performed using PKI based authentication. It is here assumed that the authentication of the UE 111 is successful.

Upon successful authentication, the AAA server submits a request for subscription profile data associated with the UE to the HSS, which subscription profile data request comprises an indication that the UE has been authenticated by the AAA server. In response thereto, the HSS replies by submitting the requested subscription profile data to the AAA server. Thereafter, the UE is connected to, and may communicate via, the network.

Advantageously, even though no AAA server previously has been registered with the HSS, and hence no IMSI is registered with the HSS and associated with a subscription profile of a user of the UE, the HSS will still upload the requested subscription profile data to the AAA server upon successful authentication of the UE at the AAA server. The UE may be identified at the HSS by means of e.g. a virtual IMSI associated with a real IMSI of a SIM device registered at the HSS. Hence, a subscription profile of the non-SIM device is associated with a subscription profile of a SIM device in the HSS.

Thus, the UE is advantageously authenticated with the network, and the requested subscription profile data is downloaded by the AAA server, even when an AAA server and the UE previously have not been registered with the HSS.

The disclosure further relates to computer programs for causing the devices to perform the methods according to the disclosure, and corresponding computer program products.

Embodiments of the disclosure will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The disclosure is now described, by way of example, with reference to the accompanying drawings, in which.

DETAILED DESCRIPTION

The disclosure will now be described more fully hereinafter with reference to the accompanying drawings, in which certain embodiments are shown. This disclosure may, however, be embodied in many different forms and should not be construed as limited to the embodiments set forth herein; rather, these embodiments are provided by way of example so that this disclosure will be thorough and complete, and will fully convey the scope to those skilled in the art. Like numbers refer to like elements throughout the description.

Figure 1:
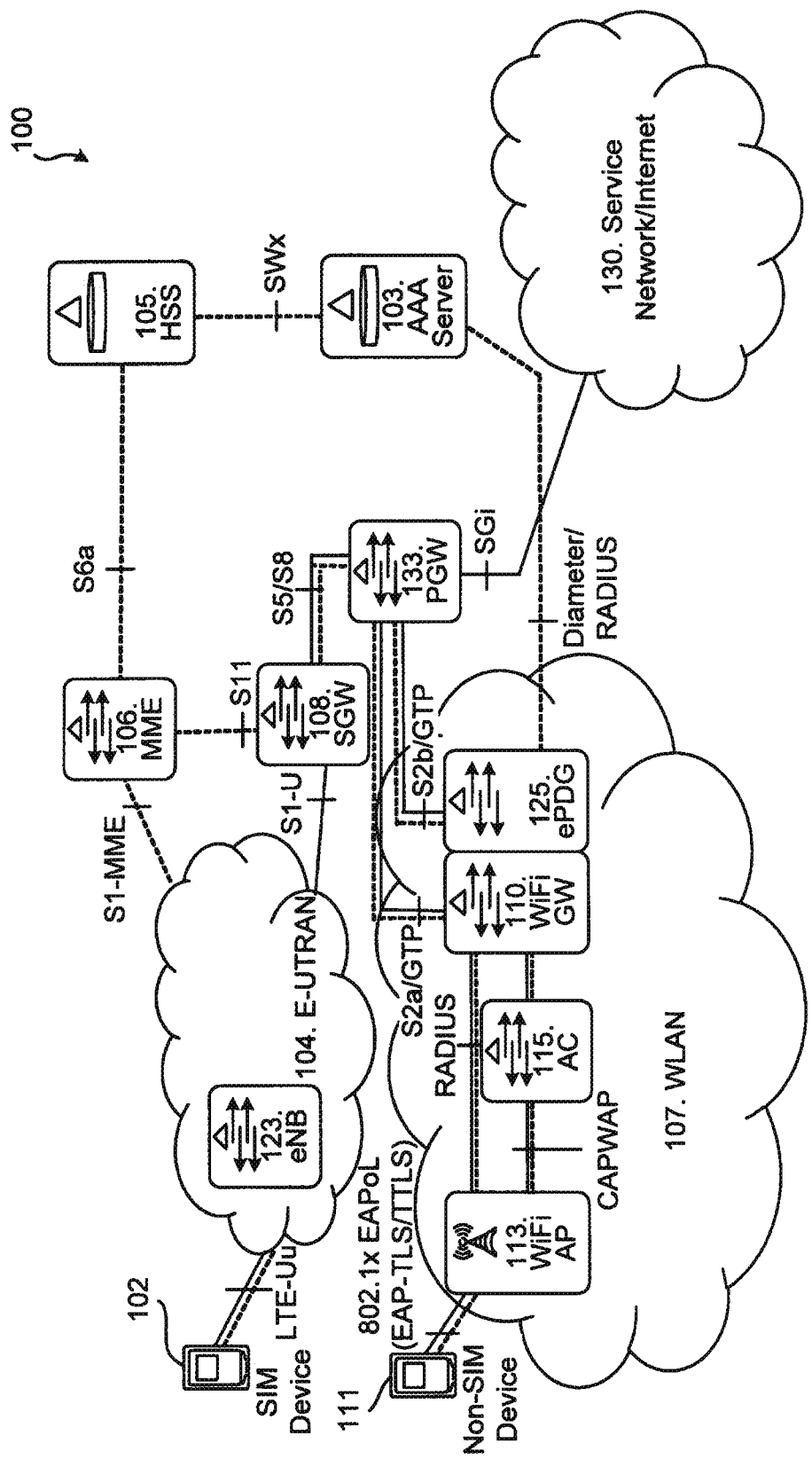
FIG. 1 shows a schematic overview of an exemplifying wireless communication network in which the present disclosure can be implemented.

FIG. 1 shows a schematic overview of an exemplifying wireless communication network 100 in which the present disclosure can be implemented. The wireless communication network 100 is an LTE based network. It should be pointed out that the terms "LTE" and "LTE based" network is here used to comprise both present and future LTE based networks, such as, for example, advanced LTE networks. It should be appreciated that although FIG. 1 shows a wireless communication network 100 in the form of an LTE based network, the example embodiments herein may also be utilized in connection with other wireless communication networks, such as e.g. Global System for Mobile Communications (GSM) or Universal Mobile Telecommunication System (UMTS) networks, comprising nodes and functions that correspond to the nodes and functions of the network in FIG. 1. It should be noted that the network in FIG. 1 is simplified; in practice, an LTE network comprises further functional entities than those illustrated with reference to FIG. 1. In FIG. 1, user plane data connections are indicated by means of continuous lines while control plane data connections are indicated by means of dashed lines.

The wireless communication network 100 comprises one or more base stations in the form of an eNodeB 123, operatively connected to a Serving Gateway 108 (SGW), in turn operatively connected to a Mobility Management Entity 106 (MME) and a Packet Data Network Gateway 133 (PGW). The eNodeB 123 is a radio access node that interfaces with a first mobile radio terminal 102, e.g. a UE, equipped with a SIM card.

The eNodeB 123 of the network forms the radio access network called Evolved Universal Terrestrial Radio Access Network (E-UTRAN) 104 for LTE communicating with the first UE 102 over an air interface such as LTE-Uu. The core network in LTE is known as Evolved Packet Core (EPC), and the EPC together with the E-UTRAN is referred to as Evolved Packet System (EPS). The SGW 108 routes and forwards user data packets over the S1-U interface, whilst also acting as the mobility anchor for the user plane during inter-eNodeB handovers and as the anchor for mobility between LTE and other 3rd Generation Partnership Project (3GPP) technologies. For idle state UEs, the SGW 108 terminates the downlink data path and triggers paging when downlink data arrives for the first UE 102, and further manages and stores UE contexts, e.g. parameters of the IP bearer service, network internal routing information. It also performs replication of the user traffic in case of lawful interception. The SGW 108 communicates with the MME 106 via interface S11 and with the PGW 133 via the S5/S8 interface. Further, even though not shown in FIG. 1, the SGW 108 may communicate with UMTS radio access network UTRAN and with GSM EDGE ("Enhanced Data rates for GSM Evolution") Radio Access Network (GERAN) via an S12 interface.

The MME 106 is responsible for idle mode UE tracking and paging procedure including retransmissions. It is involved in the bearer activation/deactivation process and is also responsible for choosing the SGW 108 for a UE at the initial attach and at time of intra-LTE handover involving core network node relocation. It is responsible for authenticating the user by interacting with the Home Subscriber Server 105 (HSS). The Non-Access Stratum (NAS) signaling terminates at the MME 106 and it is also responsible for generation and allocation of temporary identities to UEs via the S1-MME interface. It checks the authorization of the first UE 102 to camp on the service provider's Public Land Mobile Network (PLMN) and enforces UE roaming restrictions. The MME 106 is the termination point in the network for ciphering/integrity protection for NAS signaling and handles the security key management. Lawful interception of signaling is also supported by the MME 106. The MME 106 also terminates the S6a interface towards the home HSS 105 for roaming UEs.

The PGW 133 provides connectivity for UEs to external packet data networks (PDNs) by being the point of exit and entry of traffic for UEs. A UE may have simultaneous connectivity with more than one PGW for accessing multiple PDNs. The PGW 133 performs policy enforcement, packet filtering for each user, charging support, lawful Interception and packet screening. Another key role of the PGW 133 is to act as the anchor for mobility between 3GPP and non-3GPP technologies such as WiMAX and 3GPP2 (CDMA 1× and EvDO). The interface between the PGW 133 and the packet data network 130, being for instance the Internet, is referred to as the SGi. The packet data network may be an operator external public or private packet data network or an intra operator packet data network, e.g. for provision of IP Multimedia Subsystem (IMS) serviеps.

Illustrated in FIG. 1 is also a RAN 107 in the form of a trusted/untrusted Wireless Local Area Network 107 (WLAN) via which a non-SIM mobile terminal 111, such as a tablet, may connect to the EPC. The non-SIM mobile terminal 111 will in the following be referred to as "the second UE". The second UE 111 connects to the WLAN 107 via interface 802.1x EAPoL (EAP-TLS/TTLS) to WiFI Access Point (AP) 113.

The trusted/untrusted WLAN 107 connects to the EPC via an Access Controller (AC) 116 and a WiFi Gateway (GW) 110 over interface S2a/GTP to the PGW 133 in case of trusted access, and via an Evolved Packet Data Gateway (ePDG) 125 over interface S2b/GTP in case of untrusted access. The AC 116 connects to the WiFi AP 113 via the interface denoted Control And Provisioning of Wireless Access Points (CAPWAP), while the WiFi GW 110 connects to the WiFi AP 113 via the interface RADIUS.

The network further comprises a 3GPP Authentication, Authorization and Accounting (AAA) server 103, which takes care of the authentication, authorization and accounting of UEs connecting to the EPC network via (untrusted) WLAN 107 and the ePDG 125 across interface Diameter/RADIUS. The 3GPP AAA server 103 also connects to the HSS 105 via interface SWx.

Figure 2:
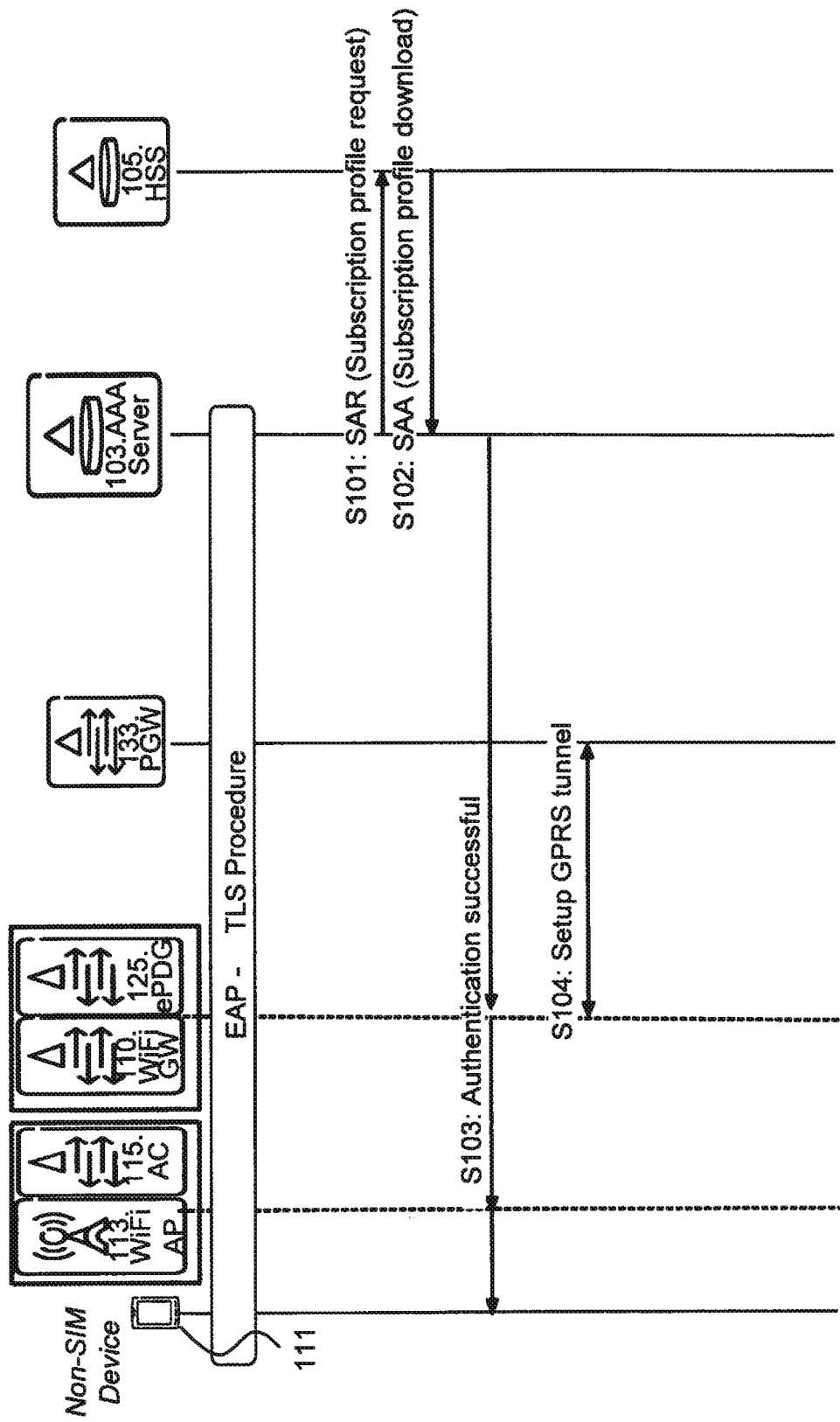
FIG. 2 shows a timing diagram illustrating a prior art procedure of authenticating a non-SIM mobile terminal with the wireless network.

FIG. 2 shows a prior art timing diagram illustrating an AAA server 103 fetching, from an HSS 105, a subscription profile of a user associated with a non-SIM mobile terminal embodied by the UE 111 in the wireless network 100, the UE 111 accessing the wireless network 100 via the WLAN 107.

Initially, an EAP-TLS procedure may be undertaken in the network 100 to authenticate the UE 111 with the network 100 via the WLAN 107. This is a procedure well-known in the art, and is described in great detail in for instance RFC 5216.

When the AAA server 103 fetches the subscription profile from the HSS 105 in step S101 after the EAP-TLS procedure has been undertaken, it sends a Server-Assignment-Request (SAR) to the HSS 105. The HSS 105 checks whether the AAA server 103 has been registered with the HSS 105 for the UE in by means of an IMSI. If so, the HSS 105 sends in step S102 a Server-Assignment-Answer (SAA) indicating that the authentication of the UE 111 is successful. The AAA server 103 sends in step S103 a confirmation that the authentication is successful to the UE 111 via the ePDG 125 and the WiFi AP 113. Thereafter, in step S104, a General Packet Radio Service (GPRS) tunnel is setup between the ePDG 125 and the PGW 133 for UE 111 communication with the network 100.

However, if the subscriber profile for the UE 111 has not been registered with the HSS 105 by means of an identifier in the form of an IMSI, authentication will not be successful, and the HSS 105 will send an error code to the AAA server 103 (referred to as "DIAMETER_UNABLE_TO_COMPLY") in its SAA in step S102, and no subscription profile will be downloaded by the AAA server 103. The UE 111 will consequently not be able to connect to the network 100 over the WLAN 107.

Figure 3:
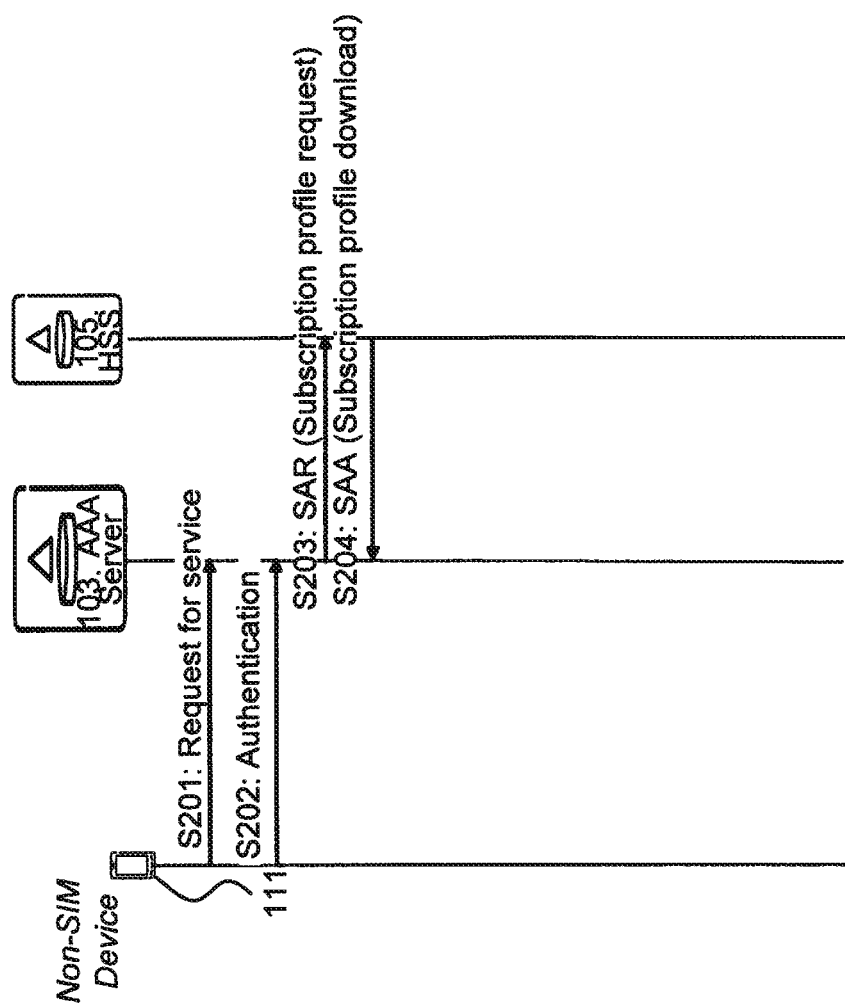
FIG. 3 shows a timing diagram illustrating an embodiment of authenticating a non-SIM mobile terminal with the wireless network.

FIG. 3 shows a timing diagram illustrating an embodiment performed by the AAA server 103 of authenticating the UE 111, being a non-SIM mobile terminal, with the wireless network 100. In FIG. 3, for brevity, the UE 111 the AAA server 103 and the HSS 105 are illustrated. However, as in the procedure described in connection to FIG. 2, a plurality of various network elements/nodes are involved for connection the UE 111 to the network 100 via the WLAN 107.

In a first step 201, the AAA server 103 receives a request for service of the UE in. Thereafter, in step S102, the UE 111 is authenticated by the AAA server 103. In an embodiment, this is performed using PKI based authentication. It is here assumed that the authentication of the UE 111 is successful.

Upon successful authentication, the AAA server 103 submits in step S203 a request for subscription profile data associated with the UE 111 to the HSS 105, which subscription profile data request comprises an indication that the UE 111 has been authenticated by the AAA server 103. This indication is in an embodiment included in, and submitted with, a SAR. In response thereto, the HSS 105 replies by submitting the requested subscription profile data to the AAA server 103. Thereafter, the UE 111 is connected to, and may communicate via, the network 100.

Advantageously, with the embodiment discussed with reference to FIG. 3, even though no AAA server previously has been registered with the HSS 105, and hence no virtual IMSI is registered with the HSS 105 and associated with a subscription profile of a user of the UE 111, the HSS 105 will still upload the requested subscription profile data to the AAA server 103 upon successful authentication of the UE 111 at the AAA server 103. The UE 111 may be identified at the HSS 105 by means of e.g. a virtual IMSI associated with a real IMSI of a SIM device registered with the HSS 105 along with the authentication indicator in step S203.

Thus, the UE 111 is advantageously authenticated with the network 100, and the requested subscription profile data is downloaded by the AAA server 103, even when an AAA server and an IMSI associated with the UE 111 previously has not been registered with the HSS 105.

Figure 4:
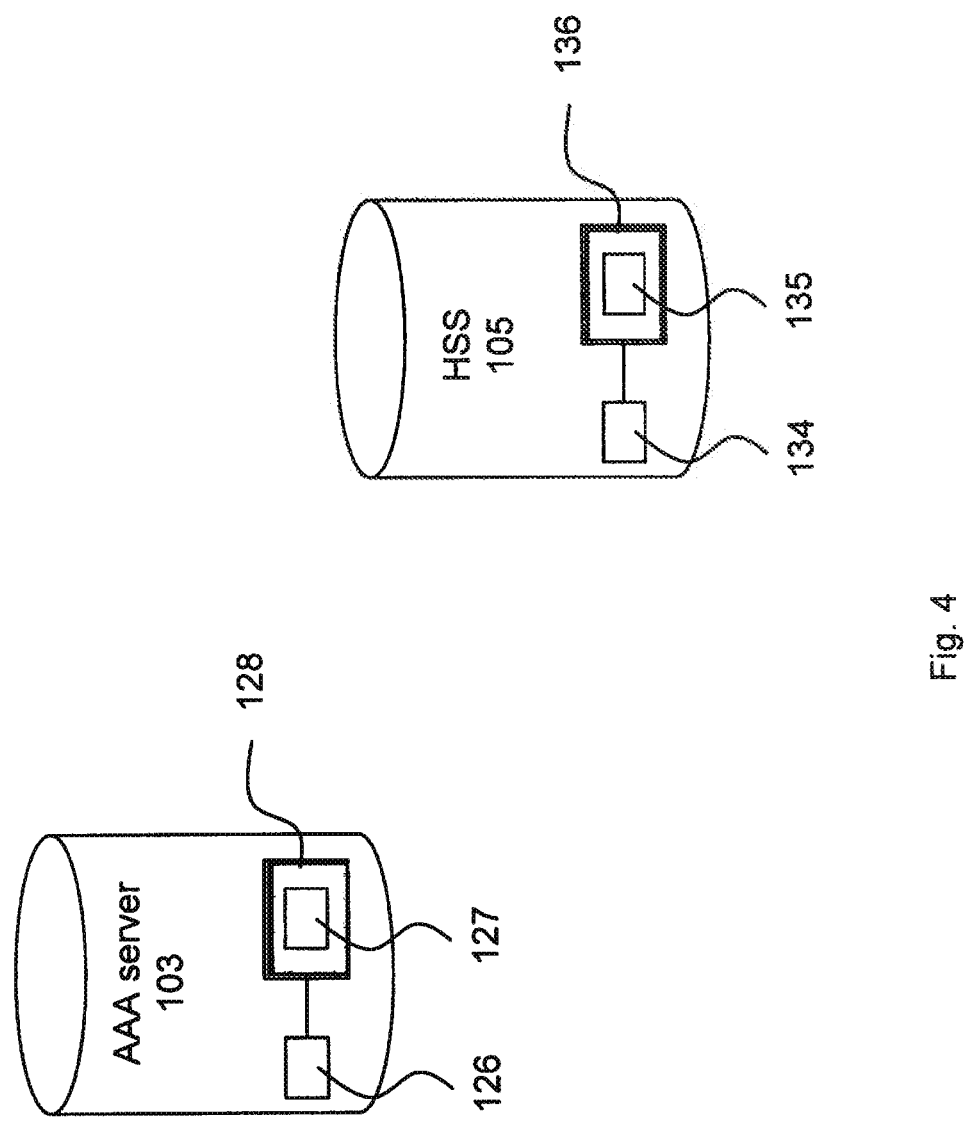
FIG. 4 illustrates an AAA server and an HSS according to an embodiment.

With reference to FIG. 4, the steps of the method performed by the AAA server 103 according to embodiments are in practice caused by a processing unit 126 embodied in the form of one or more microprocessors arranged to execute a computer program 127 downloaded to a suitable storage medium 128 associated with the microprocessor, such as a Random Access Memory (RAM), a Flash memory or a hard disk drive. Similarly, the steps of the method performed by the HSS 105 according to embodiments are in practice caused by a processing unit 134 embodied in the form of one or more microprocessors arranged to execute a computer program 135 downloaded to a suitable storage medium 136 associated with the microprocessor, such as a Random Access Memory (RAM), a Flash memory or a hard disk drive. The processing units 126, 134 are arranged to cause the AAA server 103 and the HSS 105, respectively to carry out the steps of the respective method according to embodiments when the appropriate computer programs 127, 135 comprising computer-executable instructions are downloaded to the storage media 128, 136 and executed by the processing units 126, 134. The storage media 128, 136 may also be computer program products comprising the computer programs 127, 135. Alternatively, the computer programs 127, 135 may be transferred to the storage media 128, 136 by means of a suitable computer program product, such as a Digital Versatile Disc (DVD) or a memory stick. As a further alternative, the computer programs 127, 135 may be downloaded to the storage media 128, 136 over a network. The respective processing unit 126, 134 may alternatively be embodied in the form of a digital signal processor (DSP), an application specific integrated circuit (ASIC), a field-programmable gate array (FPGA), a complex programmable logic device (CPLD), etc.

It should be noted that the methods according to the above described embodiments are exemplified as being performed by a single AAA server 103 and HSS 105, respectively, but could be performed by a number of different nodes/devices, where the steps performed are distributed over the different nodes/devices.

Figure 5:
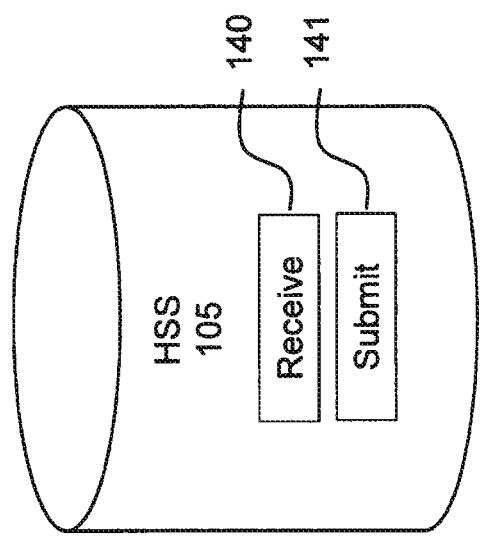
FIG. 5 illustrates an HSS according to another embodiment.

FIG. 5 illustrates an HSS 105 according to an embodiment configured to provide requested subscriber profile data associated with a non-SIM mobile terminal to an AAA server in a wireless network. The HSS 105 comprises receiving means 140 adapted to receive, from the AAA server, a request for subscriber profile data associated with the non-SIM mobile terminal, the subscriber profile data request comprising an indication that the non-SIM mobile terminal has been authenticated by the AAA server. Further, the HSS 105 comprises submitting means 141 adapted to submit, to the AAA server, in response to the indication that the non-SIM mobile terminal has been authenticated, the requested subscription profile data.

The means 140 and 141 may comprise a communications interface for receiving and providing information, and further a local storage for storing data, and may (in analogy with the description given in connection to FIG. 4) be implemented by a processor embodied in the form of one or more microprocessors arranged to execute a computer program downloaded to a suitable storage medium associated with the microprocessor, such as a RAM, a Flash memory or a hard disk drive.

Figure 6:
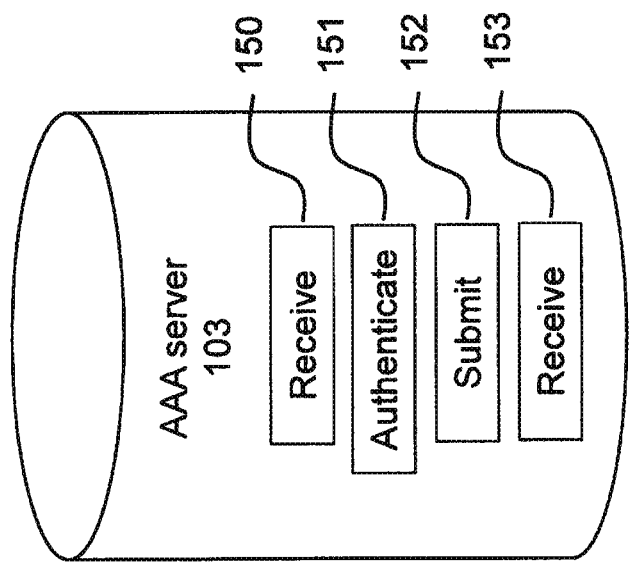
FIG. 6 illustrates an AAA server according to yet another embodiment.

FIG. 6 illustrates an AAA server 103 according to another embodiment configured to authenticate a non-SIM mobile terminal with a wireless network. The AAA server comprises receiving means 150 adapted to receive a request for service of the non-SIM mobile terminal, authenticating means 151 adapted to authenticate the non-SIM mobile terminal, submitting means 152 adapted to submit a request for subscriber profile data associated with the non-SIM mobile terminal to an HSS, the subscriber profile data request comprising an indication that the non-SIM mobile terminal has been authenticated by the AAA server, and receiving means 153 adapted to receive from the HSS, in response to the indication that the non-SIM mobile terminal has been authenticated, the requested subscription profile data. The means 150-153 may comprise a communications interface for receiving and providing information, and further a local storage for storing data, and may (in analogy with the description given in connection to FIG. 4) be implemented by a processor embodied in the form of one or more microprocessors arranged to execute a computer program downloaded to a suitable storage medium associated with the microprocessor, such as a RAM, a Flash memory or a hard disk drive.

The disclosure has mainly been described above with reference to a few embodiments. However, as is readily appreciated by a person skilled in the art, other embodiments than the ones disclosed above are equally possible within the scope of the disclosure, as defined by the appended patent claims.

What is claimed is:

1. A method performed by an Authentication, Authorization and Accounting (AAA) server of authenticating a non-Subscriber Identity Module (non-SIM) mobile terminal with a wireless network, the method comprising:
    the AAA server receiving, via an untrusted wireless local area network (WLAN), a request for service of the non-SIM mobile terminal, wherein the AAA server is not a Mobility Management Entity (MME);
    the AAA server authenticating the non-SIM mobile terminal;
    after the AAA server authenticates the non-SIM mobile terminal, the AAA server submitting a request for subscriber profile data associated with the non-SIM mobile terminal to a Home Subscriber Server (HSS), the subscriber profile data request comprising: (i) an indication that the non-SIM mobile terminal has been authenticated by the AAA server and (ii) a virtual international mobile subscriber identity (IMSI) that is associated with a non-virtual IMSI of a SIM device registered with the HSS; and
    the AAA server receiving from the HSS, in response to the indication that the non-SIM mobile terminal has been authenticated, the requested subscription profile data.

2. The method of claim 1, wherein the authentication of the non-SIM mobile terminal at the AAA server is performed using public key infrastructure, PKI, based authentication.

3. The method of claim 1, wherein the submitting of a request to the HSS comprises:
    submitting a Server-Assignment-Request (SAR) comprising the indication that the non-SIM mobile terminal has been authenticated by the AAA server.

4. The method of claim 1, wherein the receiving of the requested subscription profile data from the HSS comprises:
    receiving a Server-Assignment-Answer (SAA) comprising the requested subscription profile data.

5. A method performed by a Home Subscriber Server (HSS), the method comprising:
    the HSS receiving a subscriber profile data request for subscriber profile data associated with a non-SIM mobile terminal, wherein the subscriber profile data request was transmitted by an Authentication, Authorization and Accounting (AAA) server that has authenticated the non-SIM mobile terminal and the subscriber profile data request comprises: (i) an indication that the non-SIM mobile terminal has been authenticated by the AAA server and (ii) a virtual international mobile subscriber identity (IMSI) that is associated with a non-virtual IMSI of a SIM device registered with the HSS, wherein the AAA server is not a Mobility Management Entity (MME); and the HSS submitting, to the AAA server, in response to the indication that the non-SIM mobile terminal has been authenticated by the AAA server, the requested subscription profile data.

6. The method of claim 5, wherein the authentication of the non-SIM mobile terminal at the AAA server is performed using public key infrastructure, PKI, based authentication.

7. The method of claim 5, wherein the receiving of a request from the AAA server comprises:

receiving a Server-Assignment-Request (SAR) comprising the indication that the non-SIM mobile terminal has been authenticated by the AAA server.

8. The method of claim 5, wherein the submitting of the requested subscription profile data to the AAA server comprises:

submitting a Server-Assignment-Answer (SAA) comprising the requested subscription profile data.

9. Authentication, Authorization and Accounting (AAA) server configured to authenticate a non-Subscriber Identity Module (non-SIM) mobile terminal with a wireless network, the AAA server comprising a processing unit and a memory, said memory containing instructions executable by said processing unit, whereby said AAA server is operative to:

receive, via an untrusted wireless local area network (WLAN), a request for service of the non-SIM mobile terminal, wherein the AAA server is not a Mobility Management Entity (MME);

authenticate the non-SIM mobile terminal;

after authenticating the non-SIM mobile terminal, submit a request for subscriber profile data associated with the non-SIM mobile terminal to a Home Subscriber Server (HSS), the subscriber profile data request comprising: (i) an indication that the non-SIM mobile terminal has been authenticated by the AAA server and (ii) a virtual international mobile subscriber identity (IMSI) that is associated with a non-virtual IMSI of a SIM device registered with the HSS; and receive from the HSS, in response to the indication that the non-SIM mobile terminal has been authenticated, the requested subscription profile data.

10. The AAA server of claim 9, further being operative to:
perform the authentication of the non-SIM mobile terminal using public key infrastructure, PKI, based authentication.

11. The AAA server of claim 9, further being operative to:
submit a Server-Assignment-Request (SAR) comprising the indication that the non-SIM mobile terminal has been authenticated by the AAA server.

12. The AAA server of claim 9, further being operative to:
receive a Server-Assignment-Answer (SAA) comprising the requested subscription profile data.

13. A Home Subscriber Server (HSS), the HSS comprising a processing unit and a memory, said memory containing instructions executable by said processing unit, whereby said HSS is operative to:

receive a subscriber profile data request for subscriber profile data associated with a non-SIM mobile terminal, wherein the subscriber profile data request was transmitted by an Authentication, Authorization and Accounting (AAA) server that has authenticated the non-SIM mobile terminal and the subscriber profile data request comprises: (i) an indication that the non-SIM mobile terminal has been authenticated by the AAA server and (ii) a virtual international mobile subscriber identity (IMSI) that is associated with a non-virtual IMSI of a SIM device registered with the HSS, wherein the AAA server is not a Mobility Management Entity (MME); and submit, to the AAA server, in response to the indication that the non-SIM mobile terminal has been authenticated by the AAA server, the requested subscription profile data.

14. The HSS of claim 13, wherein the authentication of the non-SIM mobile terminal at the AAA server is performed using public key infrastructure, PKI, based authentication.

15. The HSS of claim 13, further being operative to:
receive a Server-Assignment-Request (SAR) comprising the indication that the non-SIM mobile terminal has been authenticated by the AAA server.

16. The HSS of claim 13, further being operative to:
submit a Server-Assignment-Answer (SAA) comprising the requested subscription profile data.

17. A computer program product comprising a non-transitory computer readable medium, the computer readable medium having computer-executable instructions for causing a device to perform steps recited in claim 1 when the computer-executable instructions are executed on a processing unit included in the device.

18. A computer program product comprising a non-transitory computer readable medium, the computer readable medium having computer-executable instructions for causing a device to perform steps recited in claim 5 when the computer-executable instructions are executed on a processing unit included in the device.

19. The method of claim 5, wherein
prior to submitting the requested subscription profile data, the HSS uses the virtual IMSI contained in the request to obtain from a database the requested subscription profile data.

* * * * *